US012737930B2

(12) United States Patent
Lang et al.

(10) Patent No.: US 12,737,930 B2
(45) Date of Patent: Sep. 15, 2026

(54) FEATURE LAYERS FOR RENDERING OF DESIGN OPTIONS

(71) Applicant: WTS Paradigm, LLC, Middleton, WI (US)

(72) Inventors: James Lang, Middleton, WI (US); Kevin Wilson, Middleton, WI (US); Nathan Herbst, Middleton, WI (US)

(73) Assignee: WTS Paradigm, LLC, Middleton, WI (US)

( * ) Notice: Subject to any disclaimer, the term of this patent is extended or adjusted under 35 U.S.C. 154(b) by 212 days.

(21) Appl. No.: 18/220,661

(22) Filed: Jul. 11, 2023

(65) Prior Publication Data

US 2024/0013452 A1 Jan. 11, 2024

Related U.S. Application Data

(60) Provisional application No. 63/388,031, filed on Jul. 11, 2022.

(51) Int. Cl.

| | |
|---|---|
| ***G06T 11/00*** | (2026.01) |
| ***G06T 7/00*** | (2017.01) |
| ***G06T 7/73*** | (2017.01) |

(52) U.S. Cl.

CPC .............. *G06T 11/00* (2013.01); *G06T 7/001* (2013.01); *G06T 7/73* (2017.01); *G06T 2200/24* (2013.01); *G06T 2207/30108* (2013.01); *G06T 2207/30168* (2013.01); *G06T 2210/04* (2013.01)

(58) Field of Classification Search

CPC . G06T 11/00; G06T 7/73; G06T 7/001; G06T 2200/24; G06T 2207/30108; G06T 2207/30168; G06T 2210/04

See application file for complete search history.

(56) References Cited

U.S. PATENT DOCUMENTS

| | | | | |
|---|---|---|---|---|
| 2010/0060640 | A1* | 3/2010 | Melikian | G06T 15/20<br>345/427 |
| 2018/0032214 | A1* | 2/2018 | Chen | G06T 17/20 |
| 2019/0095985 | A1* | 3/2019 | Wang | G06Q 30/0643 |
| 2020/0111263 | A1* | 4/2020 | Huang | G06Q 30/0643 |
| 2020/0228774 | A1* | 7/2020 | Kar | G06T 15/08 |
| 2022/0171893 | A1* | 6/2022 | Ye | G06T 17/20 |
| 2022/0254086 | A1* | 8/2022 | Chandrasekaran | G06T 13/40 |
| 2022/0353486 | A1* | 11/2022 | McCready | G06T 15/00 |
| 2022/0406027 | A1* | 12/2022 | Cini | G06T 19/20 |

(Continued)

*Primary Examiner* — Yu Chen

(74) *Attorney, Agent, or Firm* — Womble Bond Dickinson (US) LLP

(57) ABSTRACT

Systems and methods are provided for generating electronic renderings using feature layers. A set of sample electronic renderings can be generated for a virtual space based on feature data (e.g., including a set of features of the virtual space). Rendering data can be determined based on the set of sample electronic renderings, wherein the rendering data includes a set of feature layers, and wherein each feature layer is associated with at least one feature of the set of features. A rendering request can be received, the rendering request including a subset of features and associated feature parameters selected from the set of features as selected feature data, and an electronic rendering can be generated of the virtual space based on the selected feature data and one or more of the feature layers.

23 Claims, 5 Drawing Sheets

(56) References Cited

U.S. PATENT DOCUMENTS

2023/0141027 A1* 5/2023 Cerrato .................. G06F 3/013
345/419
2023/0325908 A1* 10/2023 Lee ........................ G06Q 40/06
705/14.23
2025/0097276 A1* 3/2025 Deliz Centeno ........ G06T 13/40

* cited by examiner

FEATURE LAYERS FOR RENDERING OF DESIGN OPTIONS

CROSS-REFERENCE TO RELATED APPLICATIONS

This patent application claims the benefit of U.S. Provisional Patent Application No. 63/388,031, filed Jul. 11, 2022, the entire contents of which are incorporated herein by reference.

BACKGROUND

An electronic rendering may be a graphical representation of a virtual space or environment, such as, e.g., an architectural rendering, a photorealistic architectural rendering, a photorealistic drawing, or the like. As one example, the electronic rendering may be a photorealistic architectural rendering or drawing representing a remodeled kitchen prior to the kitchen actually being remodeled. Accordingly, an electronic rendering may visually represent an anticipated or planned design, layout, or configuration for a virtual space or environment.

The discussion above is merely provided for general background information and is not intended to be used as an aid in determining the scope of the claimed subject matter.

SUMMARY OF THE DISCLOSURE

This disclosure is directed towards rendering a virtual space or environment. More particularly, the present disclosure is directed to systems and methods for generating electronic renderings for scenes with multiple possible (e.g., customizable) configurations. Some embodiments of the disclosure are directed to improvements in the generating of high quality (e.g., photorealistic quality) electronic renderings, such that processing, time, and storage, and, ultimately, cost associated with each electronic rendering, is reduced. For example, some embodiments provide for such improvements by generating electronic renderings using one or more feature layers. In the field of electronic rendering, a quality of an electronic rendering may range from a low-quality electronic rendering to a high-quality electronic rendering. Generating a high-quality electronic rendering using conventional systems is more complex and costly. Conventional systems require significant amount of processing, time, and storage. Additionally, it is not feasible to render each feature needed to provide a photorealistic quality electronic rendering. Accordingly, there is a need for rendering high quality (e.g., a photorealistic quality) electronic renderings using reduced processing, time, and storage, and, ultimately, cost associated with each electronic rendering.

According to some aspects of the disclosure, a system is provided for generating electronic renderings using feature layers. The system includes an electronic processor configured to access feature data, the feature data including a set of features (e.g., a design option, a fixture, an appliance, an object, a design selection, etc.) of a virtual space, wherein each feature included in the set of features is associated with at least one feature parameter (e.g., an attribute, characteristic or property associated with a feature, such as a color, a finish, a material, an installation, a configuration or layout, a style, a shape, a brand, a manufacturer, a texture, a dimension, etc.). The electronic processor is also configured to generate a set of sample electronic renderings for the virtual space based on the feature data. The electronic processor is also configured to determine rendering data based on the set of sample electronic renderings, wherein the rendering data includes a set of feature layers, wherein each feature layer is associated with at least one feature of the set of features. The electronic processor is also configured to receive a rendering request for the virtual space, the rendering request including a subset of features and associated feature parameters selected from the set of features as selected feature data. The electronic processor is also configured to, in response to receiving the rendering request, generate, using the rendering data, an electronic rendering of the virtual space based on the selected feature data.

According to some aspects of the disclosure, a method for generating electronic renderings using feature layers. The method includes accessing feature data, with an electronic processor, the feature data specifying at least one feature parameter for each feature of a set of features of a virtual space. The method also includes generating, with the electronic processor and based on the feature data, a set of sample electronic renderings of at least part of the virtual space, wherein each sample electronic rendering of the set is associated with the virtual space and includes a different feature configuration than at least one other sample electronic rendering of the set. The method also includes determining rendering data, with the electronic processor, based on the set of sample electronic renderings, wherein the rendering data includes a set of feature layers for each sample electronic rendering, wherein each feature layer of the set is a partial rendering of the virtual space associated with a subset of features of the set of features. The method also includes receiving, with the electronic processor, a rendering request for the virtual space generated by a user input at a user input station, the rendering request including as selected feature data a subset of features and associated feature parameters selected from the set of features. The method also includes, in response to receiving the rendering request, generating, with the electronic processor, an electronic rendering of the virtual space using one or more of the feature layers that correspond to the selected feature data.

According to some aspects of the disclosure, a method for generating electronic renderings using feature layers. The method includes receiving, with an electronic processor, a rendering request for the virtual space, the rendering request including a subset of features and associated feature parameters as selected feature data. The method also includes, in response to receiving the rendering request, generating, with the electronic processor using rendering data, an electronic rendering of the virtual space based on the selected feature data, wherein the rendering data includes a set of feature layers, wherein each feature layer is associated with at least one feature of the subset of features and is rendered before receiving the rendering request.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

BRIEF DESCRIPTION OF THE DRAWINGS

The following drawings are provided to help illustrate various features of non-limiting examples of the disclosure and are not intended to limit the scope of the disclosure or exclude alternative implementations.

DETAILED DESCRIPTION OF THE PRESENT DISCLOSURE

Figure 1:
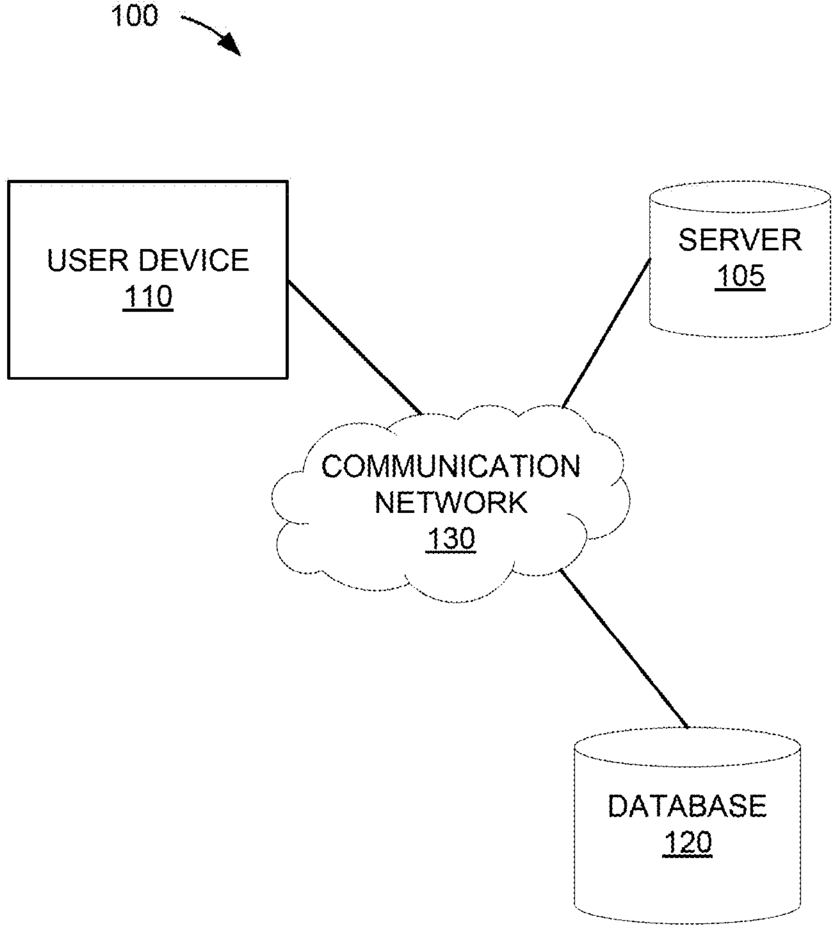
FIG. 1 schematically illustrates a system for generating electronic renderings using feature layers according to some embodiments.

As noted above, in the field of electronic rendering, a quality of an electronic rendering may range from a low-quality electronic rendering to a high-quality electronic rendering. Generating a high-quality electronic rendering using conventional systems is more complex and costly. Conventional systems require significant amount of processing, time, and storage. Additionally, it is not feasible to render each feature needed to provide a photorealistic quality electronic rendering. Accordingly, some embodiments of the disclosure are directed to improvements in the generating of high quality (e.g., photorealistic quality) electronic renderings, such that processing, time, and storage, and, ultimately, cost associated with each electronic rendering, is reduced. For example, some embodiments, provide for such improvements by generating electronic renderings using one or more feature layers.

As one example, a user may browse a catalog of design options for a bathroom remodel. The user may select as a window option a double-hung vinyl window with a 3-over-1 grid layout and a flooring option as a white rectangular ceramic tile installed in a chevron pattern (as customer selected feature data). Based on the customer selected feature data, a photorealistic quality electronic rendering may be generated such that the user may view what the bathroom will look like once the remodel is completed. The embodiments described herein may generate the photorealistic quality electronic rendering by identifying one or more pre-rendered feature layers associated with the customer selected feature data and stitching the one or more pre-rendered feature layers together as the photorealistic quality electronic rendering. Alternatively or in addition, in some embodiments, one or more pre-rendered feature layers may be generated (or built) based on pre-generating a plurality of full renderings for comparative and other types of analyses. As one example, some embodiments described herein may process sample electronic renderings to identify statistical or other patterns, including with respect to interactivity between different portions (e.g., features) of a rendered virtual space, in order to group certain portions (e.g., features) of the virtual space into feature layers for later use in customized renderings. Thus, for example, embodiments described herein may generate a set of photorealistic partial renderings of a virtual space that exhibits particular features and feature parameters (e.g., those identified as statistically prevalent in user requests) to be stored for later use in on-demand rendering for customers.

Although it may be beneficial to pre-render a large number of scenes, generating photorealistic renderings of the astronomical number of possibilities of feature parameters for even a small space with limited feature options is impractical both technologically and economically. Accordingly, as described in greater detail below, the use of sample electronic renderings to identify particular feature layers can provide functionally improved systems for generating real-time photorealistic renderings, even when subject to large numbers of feature options. For example, based on historical (and ongoing) customer feature selections, a select subset of permutations of feature options can be identified, and a plurality of (e.g., lower resolution) sample electronic renderings can be generated accordingly. Analysis of the generated sample renderings can then identify, for example, features that must be similarly re-rendered based on similar feature changes, or features that are not re-rendered similarly based on similar feature changes, and can group subsets of features into particular feature layers accordingly. Thereafter, select feature layers (e.g., of an even smaller subset of permutations of feature options) can be rendered in photorealistic resolution and stored in memory, for rapid retrieval as needed in response to later rendering requests.

Further, in some cases, renderings prepared in later requests can be analyzed to further improve the selection of feature layers that have been pre-rendered for rapid retrieval. For example, if an identified feature layer has not yet been rendered with a particular combination of feature parameters, a customer request that associates those feature parameters with that feature layer may require actual real-time rendering of that portion of the virtual space. Thereafter, however, that portion of the virtual space can be identified as being missing from an electronic stored set of pre-rendered feature layers and can be routed to storage appropriately. Thus, the use of feature layers as described herein can also thereby improve storage efficiency, by allowing select storage of pre-rendered feature layers and easy identification of rendering data (e.g., particular feature layers with particular feature parameters) that has not yet been stored. Additionally, as alluded to above, storage of feature layers in this way (e.g., as opposed to storing entire renderings) can allow more responsive adaptation of pre-rendered databases to changing input demand, including via statistical analysis (e.g., counting or averaging) of customer selections over time to identify which particular feature layers that are missing from a database are worth devoting storage space to.

FIG. 1 illustrates a system 100 for generating electronic renderings using feature layers according to some embodiments. In the illustrated example, the system 100 includes a server 105, a user device 110, and a database 120. In some embodiments, the system 100 includes fewer, additional, or different components than illustrated in FIG. 1. As one example, the system 100 may include multiple servers 105, multiple user devices 110, multiple databases 120, or a combination thereof. As another example, one or more components of the system 100 may be combined into a single device, such as, e.g., the server 105 and the database 120.

The server 105, the user device 110, and the database 120 communicate over one or more wired or wireless communication networks 130. Portions of the communication networks 130 may be implemented using a wide area network, such as the Internet, a local area network, such as a Bluetooth™ network or Wi-Fi, and combinations or derivatives thereof. Alternatively or in addition, in some embodiments, components of the system 100 communicate directly as compared to through the communication network 130. Also, in some embodiments, the components of the system 100 communicate through one or more intermediary devices not illustrated in FIG. 1.

Figure 2:
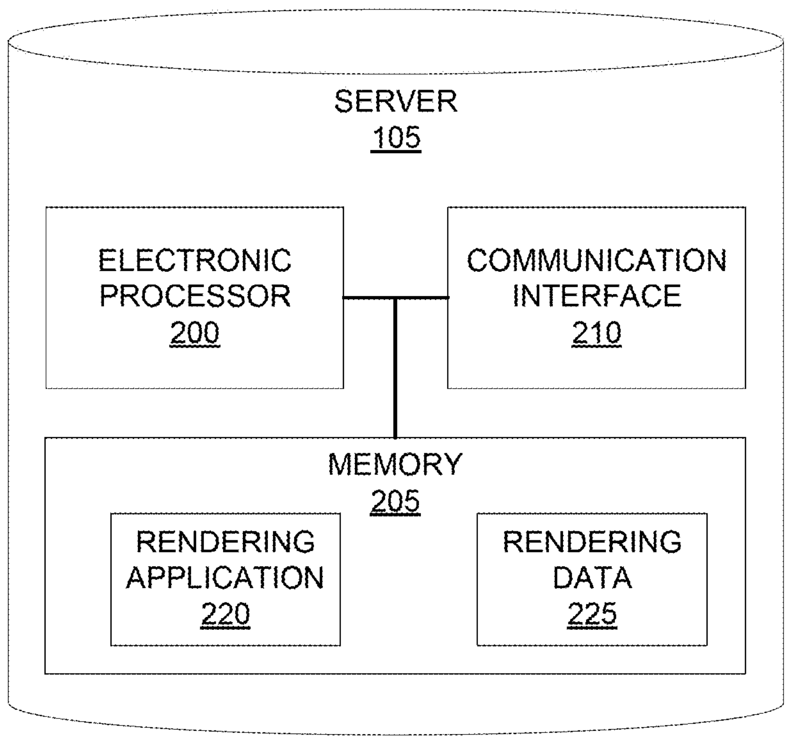
FIG. 2 schematically illustrates a server included in the system of FIG. 1 according to some embodiments.

The server 105 is a computing device, such as a server, a database, or the like. As illustrated in FIG. 2, the server 105 includes an electronic processor 200, a memory 205, and a communication interface 210. The electronic processor 200, the memory 205, and the communication interface 210 communicate wirelessly, over one or more communication lines or buses, or a combination thereof. The server 105 may include additional components than those illustrated in FIG. 2 in various configurations. For example, the server 105 may also include one or more human machine interfaces, such as a keyboard, keypad, mouse, joystick, touchscreen, display device, printer, speaker, and the like, that receive input from a user, provide output to a user, or a combination thereof. The server 105 may also perform additional functionality other than the functionality described herein. Also, the functionality described herein as being performed by the server 105 may be distributed among multiple servers or devices (e.g., as part of a cloud service or cloud-computing environment), combined with another component of the system 100 (e.g., combined with the user device 110), or a combination thereof.

The communication interface 210 may include a transceiver that communicates with the customer computing device 110, the catalog database 120, or a combination thereof over the communication network 130 and, optionally, one or more other communication networks or connections. The electronic processor 200 includes a microprocessor, an application-specific integrated circuit (ASIC), or another suitable electronic device for processing data, and the memory 205 includes a non-transitory, computer-readable storage medium. The electronic processor 200 is configured to retrieve instructions and data from the memory 205 and execute the instructions.

For example, as illustrated in FIG. 2, the memory 205 includes a rendering application 220. The rendering application 220 is a software application executable by the electronic processor 200 in the example illustrated and as specifically discussed below, although a similarly purposed module can be implemented in other ways in other examples. As described in more detail below, the electronic processor 200 executes the rendering application 220 to generate an electronic rendering (also referred to herein as "a digital rendering" or "a rendering"). An electronic rendering is a graphical representation of a virtual space or environment. Examples of an electronic rendering may include an architectural rendering, a photorealistic architectural rendering, a photorealistic drawing, or the like. An electronic rendering may be a two-dimensional (2-D) or three-dimensional (3-D) representation of a virtual space or environment. As one example, the electronic rendering may be a photorealistic architectural rendering or drawing represented a remodeled kitchen prior to the kitchen actually being remodeled. Accordingly, an electronic rendering may visually represent an anticipated or planned design, layout, or configuration for a virtual space or environment (e.g., as a printed photorealistic copy or as a display on a touchscreen or other user interface). As used herein, "photorealistic" refers to a rendering or drawing that emulates or depicts the look of a photograph (e.g., as if a photograph were taken or generated).

A virtual space may be associated with a pre-existing physical space, such as a bathroom or kitchen (e.g., based on photographs, specifications, or other real-world parameters for the pre-existing space). In such embodiments, the pre-existing physical space may be subject to a design or configuration change (e.g., a remodeling project). Alternatively or in addition, the virtual space may be associated with a non-existent physical space, such as a kitchen of a new house that has not yet been built. A virtual space may be a commercial space, a residential space, or the like. A virtual space may be an interior space, such as a room or area within a building or structure. For example, the virtual space may be a kitchen, a breakroom, a bathroom, a bedroom, a laundry room, a basement, or the like. Alternatively or in addition, a virtual space may be an exterior space, such as a backyard, an outdoor pool, a gazebo, a park, or the like. In some embodiments, the virtual space may be associated with an external space or environment, such as a building exterior or facade.

In some embodiments, the rendering application 220 generates an electronic rendering using rendering data 225 (also stored in the memory 205). For example, in some embodiments, the rendering application 220 receives a rendering request associated with a virtual space and accesses the rendering data 225 to generate an electronic rendering of the virtual space. Alternatively or in addition, in some embodiments, the electronic processor 200 executes the rendering application 220 to generate the rendering data 225, as described in greater detail below. For example, in some embodiments, the rendering application 220 generates one or more sample electronic renderings and processes the sample electronic renderings to generate the rendering data 225. In some embodiments, the rendering application 220 processes sample electronic renderings to identify statistical or other patterns, including with respect to interactivity between different portions (e.g., features) of a rendered virtual space, in order to group certain portions (e.g., features) of the virtual space into feature layers for later use in customized renderings.

Returning to FIG. 1, database 120 may be a computing device, such as a server, a database, or the like. The database may store feature data. Feature data may include one or more features associated with a virtual space. A feature may include, e.g., a design option, a fixture, an appliance, an object, a design selection, or the like. For example, a feature may include a flooring type, a cabinet selection, a fixture selection, or the like. In some embodiments, a feature may be associated with one or more feature parameters (also referred to herein as "feature options"). A feature parameter generally refers to an attribute, characteristic, or property associated with a feature. A feature parameter may include, e.g., a configuration, a layout, an installation (e.g., flush inset installation, a standard inset installation, etc.), a material (e.g., steel, glass, porcelain, marble, granite, cedar, maple, pine, birch, engineered wood, stone, quartz, metal, plastic, copper, etc.), a color (e.g., grey, black, green, white, beige, etc.), a texture (e.g., smooth, textured, rough, etc.), a brand, a manufacturer, a finish (e.g., stained, painted, polished, matte, etc.), a style (e.g., contemporary, modern, farmhouse, traditional, etc.), a dimension (e.g., depth, height, width, etc.), a dimensional range (e.g., a depth range, a height range, a width range, etc.), a type or category, a product grouping or designation (e.g., a product series, a product model, a product collection, etc.), an alignment (e.g., centered, offset, etc.), a shape, or the like.

As one example, when the feature is a refrigerator, a feature parameter may relate to a configuration of the refrigerator, such as, e.g., a side-by-side configuration, a French door configuration, or the like. As another example, when the feature is tile flooring, a feature parameter may relate to a layout or pattern of the tile flooring (e.g., a chevron layout, a herringbone layout, a double herringbone layout, a basket weave, or the like), a tile color (e.g., white, grey, or the like), a tile material (e.g., ceramic, porcelain, glass, marble, granite, or the like), a tile shape (e.g., a hexagon, a square, a circle, a rectangle, a picket, a diamond, or the like), or the like. As yet another example, where the feature is a light fixture, a feature parameter may relate to a number of bulbs (e.g., two-bulb, three-bulb, etc.), a type of bulb (e.g., LED, incandescent, halogen, compact fluorescent light, etc.), a type or category (e.g., interior, exterior, chandelier, pendant, track, recessed, lantern, flush mount, semi-flush mount, etc.), a light output (e.g., 2700K, 4000K-5000K, etc.), a voltage (e.g., 12 V, 24 V, etc.), a shade or drum material (e.g., a fabric shade, a glass shade, etc.), a style (e.g., contemporary, americana, crystal, nautical, rustic, restoration, western, craftsman, mission, etc.), and the like. As yet another example, where the feature is a window, a feature parameter may relate to dimensions (e.g., a width, a height, a depth, etc.), type or category of window (e.g., a single hung window, a double hung window, an awning window, a transom window, a bay window, an arched window, a picture window, a casement window, an egress window, etc.), a shape (e.g., rectangle, square, circle, oval, hexagon, pentagon, etc.), a glass characteristic (e.g., tempered glass, stained glass, frosted or obscured glass, etc.), a product series (e.g., a window series provided by a particular brand or manufacturer), a configuration or layout (e.g., a grouping of two windows, a single window, a grouping of three windows, etc.), a grid characteristic or layout (e.g., a 3-over-1 grid layout, a 6-over-6 layout, etc.), a material (e.g., wood, vinyl, aluminum, fiberglass, wood-clad, composite, etc.), and the like.

In some embodiments, the feature data is electronically organized in a catalog, such as a digital catalog of design options for a virtual space. As one example, the feature data may represent a catalog of design options available to an end user or customer (e.g., an owner of the virtual space). In some embodiments, the feature data (or catalog) is specific to a rendering entity, such as, e.g., a design entity, a remodeling entity, a construction entity, a building entity, or the like. Accordingly, in some embodiments, the feature data is accessible by a user via the user device 110, as described in greater detail below.

The user device 110 also includes a computing device, such as a desktop computer, a laptop computer, a tablet computer, a terminal, a smart telephone, a smart television, a smart wearable, or another suitable computing device that interfaces with a user. Although not illustrated in FIG. 1, the user device 110 may include similar components as the server 105, such as electronic processor (for example, a microprocessor, an application-specific integrated circuit (ASIC), or another suitable electronic device), a memory (for example, a non-transitory, computer-readable storage medium), a communication interface, such as a transceiver, for communicating over the communication network 130 and, optionally, one or more additional communication networks or connections, and one or more human machine interfaces. For example, to communicate with the server 105 (or another component of the system 100), the user device 110 may store a browser application or a dedicated software application executable by an electronic processor. The system 100 is described herein as providing an electronic rendering service through the server 105. However, in other embodiments, the functionality described herein as being performed by the server 105 may be locally performed by the user device 110. For example, in some embodiments, the user device 110 may store the rendering application 220, the rendering data 225, or a combination thereof.

The user device 110 may be used by a user associated with a rendering entity, such as a rendering administrator, representative, or draftsperson. Alternatively or in addition, the user device 110 may be used by an end user or customer of the rendering entity, such as a homeowner seeking the services of the rendering entity. The user may use the user device 110 to interact with the feature data (e.g., a catalog of design options). As one example, the user may interact with the feature data by viewing (on the user device 110) a listing of features and associated feature parameters and selecting one or more features, feature parameters, or a combination thereof. Alternatively or in addition, the user may use the user device 110 to interact with the rendering application 220. A user may interact with the rendering application 220 to generate an electronic rendering of a virtual space, generate the rendering data 225, or a combination thereof.

Alternatively or in addition, the user may use the user device 110 to provide updated feature data (e.g., as updated design or feature options). Updated feature data may include a modification or update to the feature data (e.g., additional, different, or fewer features, feature parameters, or a combination thereof). In some embodiments, the updated feature data may be transmitted from the user device 110 to the database 120 for storage. In response to receiving the updated feature data, the database 120 may add the updated feature option(s) to the existing feature option data, update the existing feature option data based on the updated feature option(s), replace existing feature option(s) with the updated feature option(s), or the like.

Figure 3:
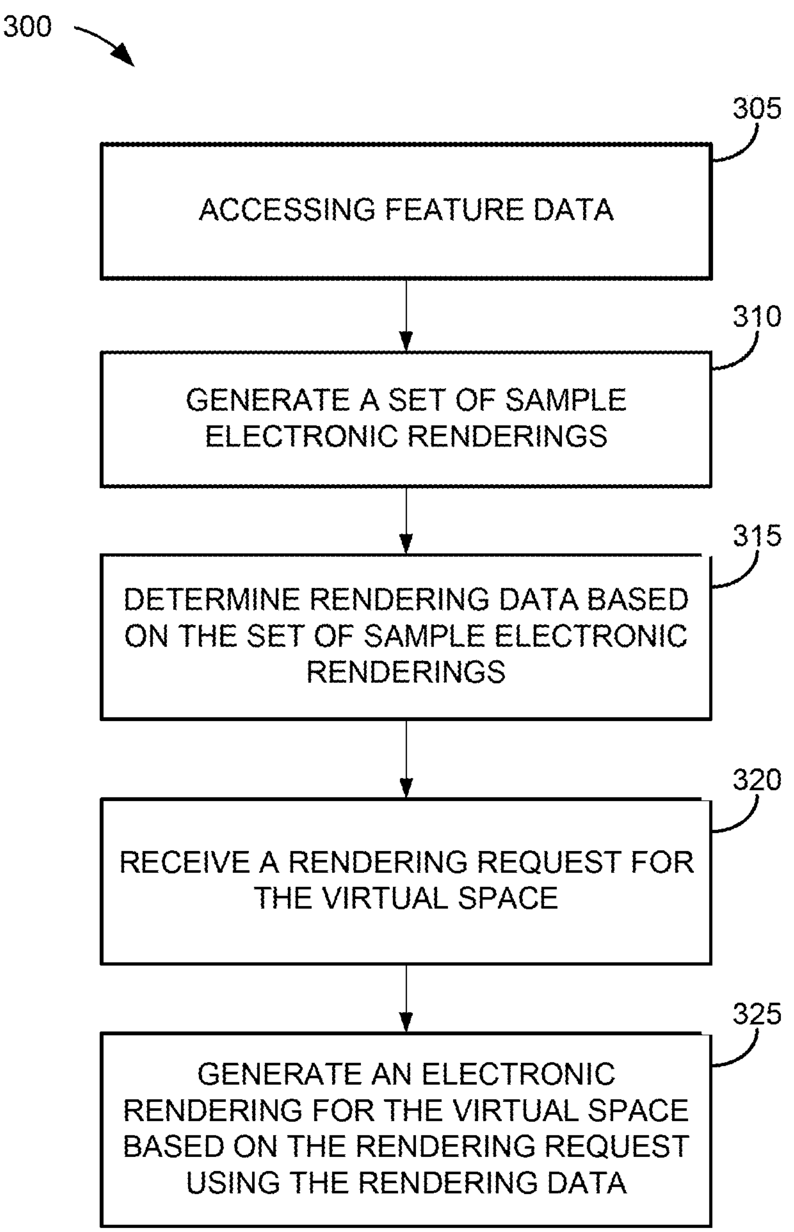
FIG. 3 is a flowchart illustrating a method for generating electronic renderings using feature layers according to some embodiments.

FIG. 3 is a flowchart illustrating a method 300 for generating electronic renderings using feature layers performed by the system 100 according to some embodiments. The method 300 is described as being performed by the server 105 and, in particular, the rendering application 220 as executed by the electronic processor 200. However, as noted above, the functionality described with respect to the method 300 may be performed by other devices, such as the user device 110, or distributed among a plurality of devices, such as a plurality of servers included in a cloud service.

As illustrated in FIG. 3, the method 300 includes accessing feature data (at block 305). As noted above, the feature data may be stored in the database 120. Accordingly, in some embodiments, the electronic processor 200 accesses the feature data from the database 120 through the communication network 130. Alternatively or in addition, in some embodiments, the feature data may be stored in another or different device or component. In such embodiments, the electronic processor 200 may access the feature data from another device or component. As one example, the feature data may be locally stored in the memory 205. Accordingly, the electronic processor 200 may access the feature data from the memory 205. As described in greater detail above, the feature data may include one or more features (and associated feature parameters). In some embodiments, the one or more features may be associated with (or specific to) a virtual space or environment.

After accessing the feature data (at block 305), the electronic processor 200 generates a set of sample electronic renderings for the virtual space based on the feature data (at block 310). In some embodiments, the electronic processor 200 generates the set of sample electronic renderings using a low-quality rendering technique, engine, or platform, such as a rendering platform that produces rapid electronic renderings (e.g., generates electronic renderings in approximately one second per rendering) or otherwise produces representative but not photorealistic renderings. A low-quality rendering may include a low-resolution rendering, such as a rendering with a low or lesser pixel count. As one example, with respect to demonstrating lighting in a rendering, a low-quality rendering may be generated using rasterization as opposed to ray-tracing (e.g., as may underlie high-quality renderings). For example, low-quality rendering techniques may represent a low number of reflective interactions and sight-line overlays, as may usefully represent interactivity between features (e.g., reflections, transparent and other visual overlays, perspective a relatively locational distance, etc.) but may not be of sufficient quality to be perceived as a photographed real scene by average human vision. Accordingly, in such embodiments, the set of sample electronic renderings may be low-quality electronic renderings (e.g., associated with a low rendering quality metric, such as, e.g., a low-resolution, a low pixel count, simple lighting, etc.).

In some embodiments, the set of sample electronic renderings may include a sample electronic rendering for each configuration of features and associated feature parameters included in the feature data. As one example, when the feature data includes a feature that may be associated with a first feature parameter or a second feature parameter, the set of sample electronic renderings may include a first sample electronic rendering of the virtual space including the feature based on the first feature parameter and a second sample electronic rendering of the virtual space including the feature based on the second feature parameter. Accordingly, in some embodiments, the electronic processor 200 generates a sample electronic rendering for each feature configuration (e.g., each different configuration of features and associated feature parameters). In some embodiments, a sample electronic rendering of a feature parameter may include a representation of only part of a feature (e.g., a base portion of a lighting fixture, a reflective or painted surface, etc.). In some embodiments, a sample electronic rendering of a feature parameter may include a representation of part or all of multiple features associated with the feature parameter (e.g., a representation of painted surfaces of multiple furnishings, fixtures, etc. relative to a feature parameter of paint color, texture, finish, age, material, etc.).

The electronic processor 200 may then determine rendering data (e.g., the rendering data 225) based on the set of sample electronic renderings (at block 315), including as can inform identifying and pre-rendering electronic renderings of feature layers with select features (or parts thereof) and feature parameters for use to satisfy later rendering requests. As illustrated in FIG. 2, the rendering data 225 may be stored in the memory 205. However, in some embodiments, the rendering data 225 may be stored in a remote device or component, such as, e.g., the user device 110, the database 120, or the like.

In some embodiments, the rendering data 225 may include the set of sample electronic renderings. Alternatively or in addition, in some embodiments, the rendering dataset may include data associated with the set of sample electronic renderings. For example, in some embodiments, the electronic processor 200 determines the rendering data 225 by analyzing the set of sample electronic renderings. The rendering data 225 may include or describe variations between sample electronic renderings included in the set of sample electronic renderings. For example, the variations may describe how at least one sample electronic rendering changed in response to a change to a different configuration of one or more features and associated feature parameters (e.g., a feature configuration change). In some embodiments, the determined rendering data 225 can include sample electronic renderings for a partial or complete permutation of features and feature parameters available for customer selection, relative to a particular type of rendering.

In some embodiments, the electronic processor 200 may analyze a sample electronic rendering (or a select set of multiple sample electronic renderings) to determine a set of feature layers associated with the set of sample electronic rendering. For example, based on analysis of sample renderings representing a full permutation of a set of feature parameters, the electronic processor 200 may determine that particular aspects of electronic renderings of a virtual space exhibit correlated rendering requirements (e.g., always require re-rendering together in response to a particular change in a particular feature parameter). These aspects of the virtual space, which may include one or more entire features or various parts thereof, can be grouped together into a feature layer, and this feature layer may be included in the set of feature layers. Such a feature layer, for example, may exhibit sufficiently specified feature parameters for rendering (e.g., photorealistic rendering) but may not necessarily include all of a virtual space or even all of any single feature. In some cases, a feature layer can include a rendering of all of the features included in the layer, isolated from the remainder of the rendered or renderable elements in the relevant virtual scene (i.e., may not include renderings of features not included in the feature layer). In this regard, therefore, a feature layer is generally a partial rendering of a virtual space, which includes a select subset of features (but not all features) of the virtual space.

In some embodiments, the electronic processor 200 may determine the set of feature layers based on one or more features (or feature types) of the virtual space (e.g., such that each feature, feature type, or other grouping of features is on its own feature layer). Accordingly, in some embodiments, a feature layer may include an electronic rendering of all the features included in a feature type (e.g., all of the flooring features or all of the countertop features) included on the layer isolated from the rest of the rendered elements in the virtual scene (e.g., features of a different feature type). As one example, the set of feature layers may include a flooring layer (as a first feature layer) associated with flooring (as a first feature), a cabinet layer (as a second feature layer) associated with cabinets (as a second feature), and a countertop layer (as a third feature layer) associated with countertops (as a third feature).

In some embodiments, a set of feature layers may collectively form a corresponding sample electronic rendering (e.g., with or without overlap between feature layers). For example, when stitched together using any range of known image stitching techniques (or simply via overlay based on pixel coordinates within a fixed scene), the set of feature layers may generate or form a sample electronic rendering with a particular combination of feature parameters.

Figure 4:
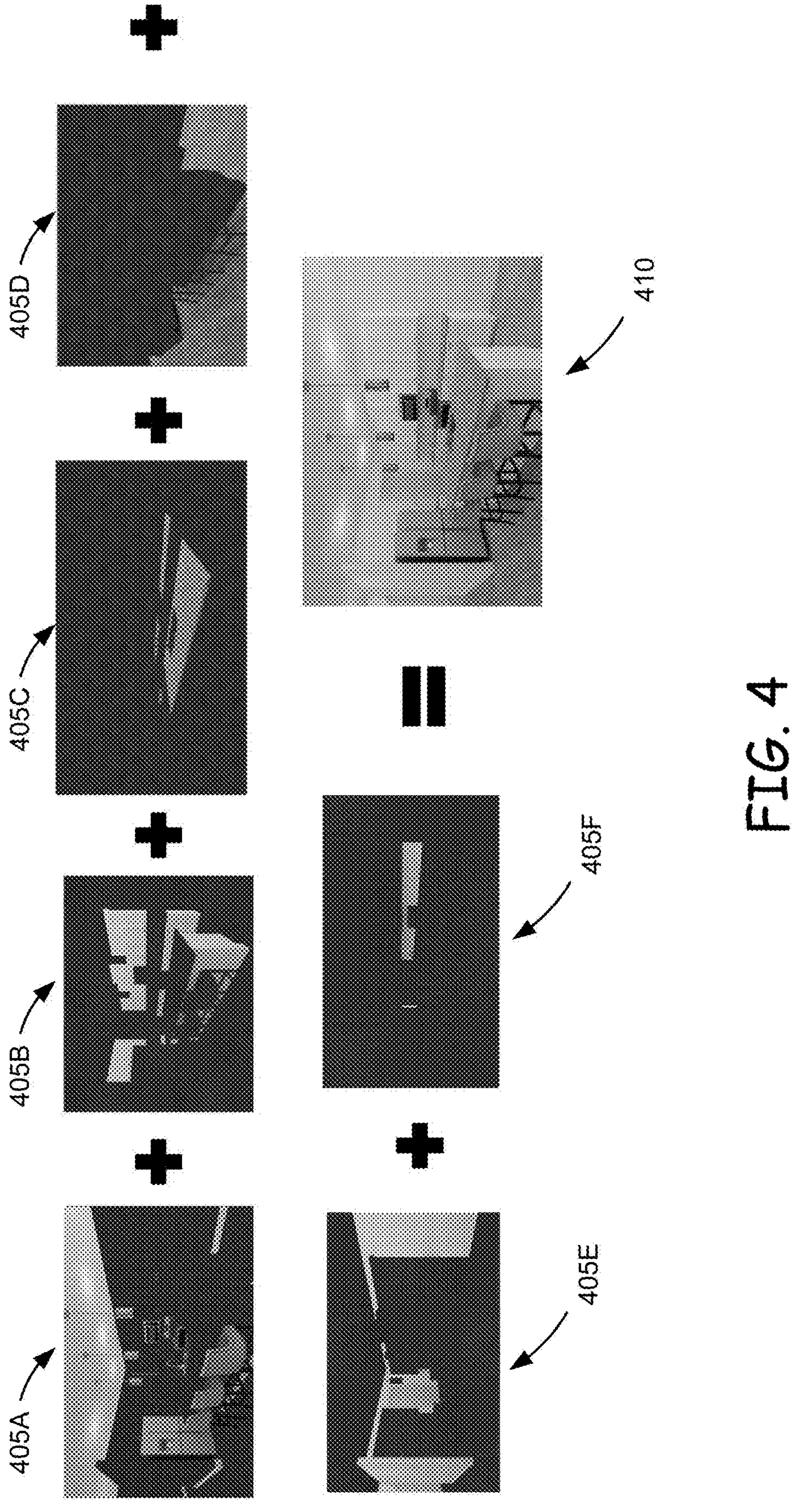
FIG. 4 is an example diagram including a set of feature layers and an electronic rendering according to some embodiments.

FIG. 4 illustrates an example set of feature layers 405 that form a sample electronic rendering 410. As illustrated in FIG. 4, when each feature layer 405 is stitched together, the feature layers 405 form the sample electronic rendering 410. Each feature layer may be associated with one or more features (e.g., a feature of the virtual space). For example, as illustrated in FIG. 4, a first feature layer 405A is associated with fixtures of the virtual space (e.g., appliances, chairs, baseboards, a sink, a faucet, and pendent lights). A second feature layer 405B is associated with cabinetry. A third feature layer 405C is associated with countertops. A fourth feature layer 405D is associated with flooring. A fifth feature layer 405E is associated with walls (e.g., a paint color). A sixth feature layer 405F is associated with a backsplash. As illustrated in FIG. 4, when each feature layer 405A-405F is stitched (or layered) together, the feature layers 405A-405F form (or generate) the sample electronic rendering 410, where the sample electronic rendering 410 includes the features (and associated feature parameters) represented in each individual feature layer. Of course, the particular features and feature parameters in the illustrated feature layers is but one example of a wide range of possibilities.

In some instances, a feature may interact with one or more additional features relative to a viewer's perspective on a rendering. As one example, a cabinet (as a first feature or feature type) may interact with an oven (as a second feature or feature type) in the form of a reflection. In other words, a cabinet may be reflected in an oven. As another example, an extended upper cabinet feature, such as a stacked upper cabinet option, (as a first feature or feature type) will cause a base cabinet feature (as a second feature or feature type) and a wall feature (as a third feature or feature type) to change (e.g., based on a configuration option change). In this example, the extended upper cabinet feature interacts with the base cabinet feature and the wall feature in the form of a configuration option change. Accordingly, in some embodiments, one feature may reflect (or otherwise interact with) another feature (or, indeed, multiple features through multiple reflections or interactions). In such instances, how one feature is rendered may be based on one or more additional features.

Accordingly, in some embodiments, the electronic processor 200 may analyze the set of sample electronic renderings to determine interactivity between features (or subgroups of features). The electronic processor 200 may determine interactivity as the presence of a reflection of one feature with respect to another feature (e.g., as reflection data), an alteration or change of one feature with respect to another feature, a statistical or other correlation between presence (or absence) of one feature with respect to another feature (e.g., satisfaction of a threshold or other frequency condition relative to changes in rendering of one feature or feature layer that results from changes in another feature or feature layer), such as, e.g., a frequency with which on feature materially changes based on a configuration option change, a common or similar (e.g., equal, substantially equal, or statistically correlated) feature parameter, etc.

Alternatively or in addition, the electronic processor 200 may determine interactivity based on an impact that a configuration option has on multiple feature layers to determine interactivity between the feature layers (e.g., based on identifying that a particular set of feature layers typically or otherwise changes based on a common set of configuration changes). In such embodiments, the electronic processor 200 may determine a number of pixels in a feature layer as a delta from an average number of pixels. In some embodiments, the electronic processor 200 can determine interactivity by counting a number of changed pixels, determining statistical characteristics of changed pixels, analyzing positional information associated with changed pixels, analyzing color characteristics associated with changed pixels, or the like. When two feature layers are changing significantly as a result of the same configuration changes, then the electronic processor 200 may determine that those feature layers have high interactivity. Accordingly, in some embodiments, the electronic processor 200 may implement one or more thresholds when determining interactivity (or a degree or level of interactivity). The electronic processor 200 may organize or assign features having interactivity to the same feature layer.

In some embodiments, a feature layer may be generated without direct association with any one full sample (or other) electronic rendering. For example, although the feature layer 405F is illustrated as forming part of the sample electronic rendering 410, the feature layer 405F (like other feature layers) may sometimes not be generated as part of an electronic rendering of an entire virtual space, but rather as a standalone rendering of only part of the virtual space (e.g., representing part or all of a particular one or more features having a particular set of feature parameters, but not representing other components of the virtual space). Correspondingly, for example, after the electronic processor 200 has identified appropriate associations between particular features (or feature parameters) and particular feature layers, the electronic processor 200 may generate electronic renderings of a variety of feature layers associated with any particular set of features or feature parameters (e.g., renderings of the features of a particular feature layer with a variety of colors, finishes, or other feature parameters). Thus, for example, the electronic processor 200 may generate a set of photorealistic partial renderings of a virtual space that exhibits particular features and feature parameters (e.g., those identified as statistically prevalent in user requests) to be stored for later use in on-demand rendering for customers.

Returning to FIG. 3, for example, the electronic processor 200 may receive a rendering request for the virtual space (at block 320). In some embodiments, the electronic processor 200 receives the rendering request from a remote device, such as the user device 110. The rendering request may include a subset of features and associated feature parameters selected from the feature data (e.g., as customer-selected feature data). As one example, a user may use the user device 110 to interact with the feature data, select a subset of the feature data (as customer-selected feature data), and generate and transmit a rendering request including the customer-selected feature data in order to request an electronic rendering of a virtual space based on the customer-selected feature data (e.g., such that the electronic rendering of the virtual space includes the selected features and associated feature parameters of the customer-selected feature data). As one example, a user may browse (e.g., via a user device 110) a digital catalog of design options (e.g., as the feature data) for a bathroom remodel. The user may select a window option (as a first feature), where the window option is a double-hung vinyl window with a 3-over-1 grid layout (as a first set of feature parameters associated with the first feature), and a flooring option (as a second feature), where the flooring option is a white rectangular ceramic tile installed in a chevron pattern (as a second set of feature parameters associated with the second feature). According to this example, the customer-selected feature data includes the first feature (including the first set of feature parameters) and the second feature (including the second set of feature parameters).

In response to receiving the rendering request (at block 320), the electronic processor 200 may generate an electronic rendering based on the rendering request using the rendering data 225 (at block 325). For example, in some embodiments, the electronic processor 200 generates the electronic rendering based on the subset of features and associated feature parameters (e.g., the features and associated feature parameters selected by a user and included in the rendering request). For example, the electronic processor 200 may analyze the rendering request to identify request data, including, e.g., the virtual space, the selected one or more features (and associated feature parameters), and the like. The electronic processor 200 may then access the rendering data 225 based on the request data to more quickly present a photorealistic rendering of the requested feature parameters than is possible (or feasible economically) with existing approaches.

In some embodiments, the electronic processor 200 determines one or more feature layers included in the rendering data 225 based on the request data. For example, the electronic processor 200 may identify one or more feature layers corresponding to the selected one or more features (and associated feature data) included in the rendering request. For example, the one or more feature layers may be identified as corresponding to the selected one or more features based on one or more identifiers (e.g., tags, codes, or the like which electronically identify the one or more feature layers or elements of the one or more feature layers) of the one or more feature layers matching or otherwise corresponding to identifiers of the selected one or more features. After identifying the corresponding one or more feature layers, the electronic processor 200 may generate the electronic rendering based on the corresponding one or more feature layers. For example, the electronic processor 200 may stitch the corresponding one or more feature layers together to form the rendering. In some embodiments, the electronic processor 200 may render some parts of a virtual space in real time (or near real time) (e.g., if a corresponding pre-rendered feature layer is not available), while rendering other parts of the virtual space by retrieving from memory one or more previously rendered feature layers that match the customer request (e.g., the rendering request).

In this regard, although it may be beneficial to pre-render a large number of scenes, generating photorealistic renderings of the astronomical number of possibilities of feature parameters for even a small space with limited feature options is impractical both technologically and economically. Accordingly, as discussed above, the use of sample electronic renderings to identify particular feature layers can provide functionally improved systems for generating real-time photorealistic renderings, even when subject to large numbers of feature options. For example, based on historical (and ongoing) customer feature selections, a select subset of permutations of feature options can be identified, and a plurality of (e.g., lower resolution) sample electronic renderings can be generated accordingly. Analysis of the generated sample renderings can then identify, for example, features that must be similarly re-rendered based on similar feature changes, or features that are not re-rendered similarly based on similar feature changes, and can group subsets of features into particular feature layers accordingly. Thereafter, select feature layers (e.g., of an even smaller subset of permutations of feature options) can be rendered in photorealistic resolution and stored in memory, for rapid retrieval as needed in response to later rendering requests.

Further, in some cases, renderings prepared in later requests can be analyzed to further improve the selection of feature layers that have been pre-rendered for rapid retrieval. For example, if an identified feature layer has not yet been rendered with a particular combination of feature parameters, a customer request that associates those feature parameters with that feature layer may require actual real-time rendering of that portion of the virtual space. Thereafter, however, that portion of the virtual space can be identified as being missing from an electronic stored set of pre-rendered feature layers and can be routed to storage appropriately. Thus, the use of feature layers as describe herein can also thereby improve storage efficiency, by allowing select storage of pre-rendered feature layers and easy identification of rendering data (e.g., particular feature layers with particular feature parameters) that has not yet been stored. Additionally, as alluded to above, storage of feature layers in this way (e.g., as opposed to storing entire renderings) can allow more responsive adaptation of pre-rendered databases to changing input demand, including via statistical analysis (e.g., counting or averaging) of customer selections over time to identify which particular feature layers that are missing from a database are worth devoting storage space to. For example, based on statistical or other analysis of customer input patterns, sample electronic renderings can be selectively generated for a subset of possible permutations of features and feature parameters.

Accordingly, in some embodiments, the electronic processor 200 may identify common configurations to have full coverage of pre-rendered data (e.g., the top 5 selected answers for every question). In some instances, the electronic processor 200 identifies common configurations based on an order of answers within each question in a catalog. Alternatively or in addition, in some instances, the electronic processor 200 identifies common configurations based on a style trend (e.g., white may be a common selection while bright green is selected infrequently). Accordingly, in some instances, the electronic processor 200, based on historical data, can determine a quantity of pre-rendering for a given configuration scenario (e.g., kitchen, house exterior, etc.). Additionally, some implementations provide for the ability to create 'just-in-time' renderings (i.e., renderings created on demand) and also cache rendering data such that it is added to the stored rendered data that can be used for future renderings.

In some embodiments, the electronic processor 200 may analyze the selected feature data to determine one or more portions of the virtual space that when rendered changes in response to a feature configuration change. A feature configuration change may be initiated in response to updated feature data, updated selected feature data, or the like.

A rendered virtual space may be divided into different portions or zones. As referred to herein, a "portion" or "zone" may refer to a predefined area of an electronic rendering (or a feature layer thereof), where the predefined area includes a subset of pixels from the set of pixels forming the electronic rendering (or a feature layer thereof). In some embodiments, a zone may correspond to a regular or otherwise repeating array of zones (e.g., geometrically similar zones) that collectively constitute an entire image (e.g., a grid of non-overlapping rectangular pixel sections). Accordingly, a zone may refer to, e.g., a pixel area of an electronic rendering (or feature layer) as opposed to a feature layer that is associated with a set of features (or related aspects of features), although a pixel region for a feature layer may be included in, extend across, entirely fill, or be entirely missing from a pixel region of one or more zones.

Figure 5:
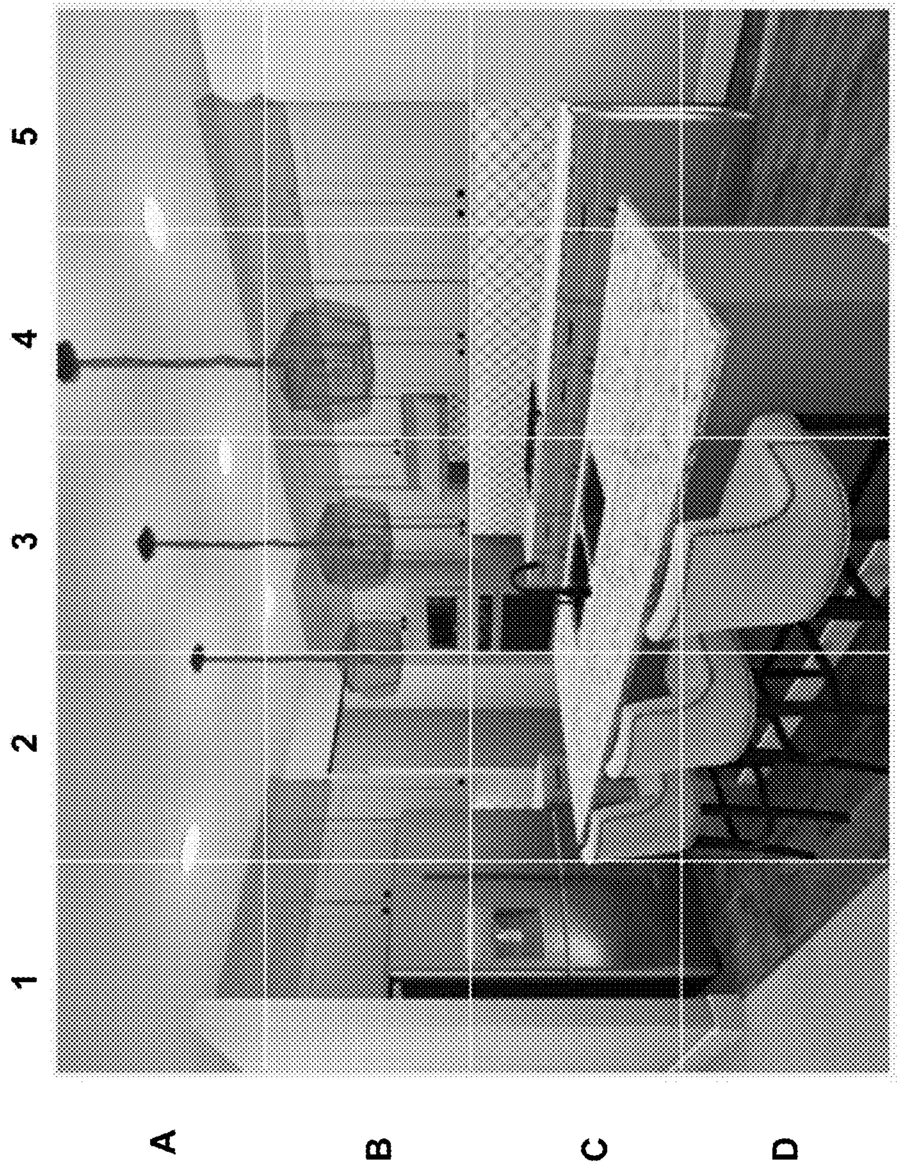
FIG. 5 is an example electronic rendering subdivided into a plurality of portions according to some embodiments.

As one example, FIG. 5 illustrates an electronic rendering of a kitchen divided into a plurality of portions (represented by a grid system). According to the grid system of FIG. 5, portions may be identified using a row-column position (portion "row position"-"column position"), where rows are designated with A-D and columns are designated with 1-5. For example, the top-left corner portion of the electronic rendering in FIG. 5 may be referred to as portion A-1 while the top-right corner portion of the electronic rendering in FIG. 5 may be referred to as portion A-5. When a feature configuration is changed, one or more portions or zones of the rendered virtual space may also change. However, one or more portions or zones of the rendered virtual space may not change (remain the same). With reference to FIG. 5, as one example, when pendant lighting is added (as a feature configuration change), portions A-2, A-3, A-4, B-2, B-3, and B-4 are changed. As another example, when the upper cabinets are extended to the ceiling (as a feature configuration change), portions A-1, A-2, A-4, A-5, B-1, B-2, B-3, B-4, and B-5 are changed.

Accordingly, in some embodiments, the electronic processor 200 subdivides an electronic rendering (e.g., one or more feature layers) into one or more different portions or zones. After subdividing the electronic rendering (or a feature layer thereof) into one or more portions, the electronic processor 200 may determine which portions are changed in response to a feature configuration change (e.g., an update to the selected feature data in response to a customer input). When generating the electronic rendering (at block 325), the electronic processor 200 may re-render portions of the electronic rendering that are changed in response to the feature configuration change (e.g., by retrieving previously rendered feature layers from memory to more quickly render at least part of the relevant zone) but may not necessarily need to re-render portions that are not changed.

Accordingly, subdividing an electronic rendering (or a feature layer thereof) as described herein reduces a rendering speed of generating an electronic rendering based on, e.g., a customer change to the selected feature data (e.g., an update to the selected feature data). As one example, after a first electronic rendering is generated and the customer requests a lighting change, only the portions or zones associated with the lighting change are re-rendered (as opposed to re-rendering the entire virtual space). Additionally, subdividing an electronic rendering (or a feature layer thereof) as described herein also improves the data interrogation process. As one example, rather than searching all possible feature layers in response to receiving a rendering request with customer-selected feature data, the embodiments described herein may only search feature layers including (or included in) zones associated with the customer-selected feature data (e.g., zones that change based on the customer-selected feature data).

In some embodiments, aspects of the invention, including computerized implementations of methods according to the invention, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media. Some embodiments of the invention can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term “article of manufacture” as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the invention, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the invention. Further, in some embodiments, certain operations can be executed in parallel, including by dedicated parallel processing devices, or separate computing devices configured to interoperate as part of a large system.

As used herein in the context of computer implementation, unless otherwise specified or limited, the terms “component,” “system,” “module,” “block,” and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Also as used herein, unless otherwise limited or defined, “or” indicates a non-exclusive list of components or operations that can be present in any variety of combinations, rather than an exclusive list of components that can be present only as alternatives to each other. For example, a list of “A, B, or C” indicates options of: A; B; C; A and B; A and C; B and C; and A, B, and C. Correspondingly, the term “or” as used herein is intended to indicate exclusive alternatives only when preceded by terms of exclusivity, such as “either,” “one of,” “only one of,” or “exactly one of.” Further, a list preceded by “one or more” (and variations thereon) and including “or” to separate listed elements indicates options of one or more of any or all of the listed elements. For example, the phrases “one or more of A, B, or C” and “at least one of A, B, or C” indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as "either," "one of," "only one of," or "exactly one of".

Although the present invention has been described by referring to preferred embodiments, workers skilled in the art will recognize that changes may be made in form and detail without departing from the scope of the discussion.

What is claimed is:

1. A system comprising:

an electronic processor configured to:

access feature data, the feature data including a set of features of a virtual space, wherein each feature included in the set of features is associated with at least one feature parameter, generate a set of sample electronic renderings for the virtual space for identifying a set of feature layers based on the feature data, determine rendering data based on the set of sample electronic renderings, wherein the rendering data includes the set of feature layers, wherein each feature layer is associated with at least one feature of the set of features, the set of feature layers representing partial renderings of the virtual space to be stored in a memory for later use in an on-demand rendering, based on an analysis of one or more sample electronic renderings of the set of sample electronic renderings, determine a feature-to-feature influence within the set of features;

receive a rendering request for the on-demand rendering, the rendering request indicating a subset of features and associated feature parameters selected from the set of features as selected feature data, the rendering request retrieving, from the memory, the set of feature layers that match the rendering request and correspond to the selected feature data, and in response to receiving the rendering request, generate, using the rendering data and according to the rendering request, an electronic rendering of the virtual space based on the selected feature data, wherein to generate the electronic rendering comprises;

determining a matching of a pre-rendered feature layer to the selected feature data in the memory;

rendering, in real time, a first part of the virtual space corresponding to at least one selected feature for which no matching a pre-rendered feature layer corresponding to the selected feature data is available in the memory; and rendering, based on retrieval from the memory, a second part of the virtual space by compositing one or more pre-rendered feature lavers that match the selected feature data.

2. The system of claim 1, wherein the electronic processor is further configured to:

determine, based on the feature-to-feature influence, the set of feature layers by organizing the subset of features having a threshold level of the feature-to-feature influence on a same one of the feature layers of the set.

3. The system of claim 2, wherein the subset of features having the feature-to-feature influence includes at least one of an appliance having a reflective surface, a cabinet, and a light fixture.

4. The system of claim 1, wherein the set of sample electronic renderings is associated with a first rendering quality metric and the electronic rendering is associated with a second rendering quality metric, wherein the second rendering quality metric is different than the first rendering quality metric.

5. The system of claim 1, wherein the set of sample electronic renderings is associated with a first rendering quality metric and the electronic rendering is associated with a second rendering quality metric, wherein the second rendering quality metric is higher than the first rendering quality metric.

6. The system of claim 1, wherein each of a plurality of sample electronic renderings included in the set of sample electronic renderings is associated with a different configuration of one or more features and associated feature parameters of the one or more features.

7. The system of claim 1, wherein the rendering data describes variations between sample electronic renderings included in the set of sample electronic renderings.

8. The system of claim 7, wherein the variations describe how at least one sample electronic rendering changed in response to a different configuration of one or more features and associated feature parameters of the one or more features.

9. The system of claim 1, wherein the rendering data identifies at least one portion of the virtual space that when rendered changes in response to a different configuration of one or more features and associated feature parameters of the one or more features.

10. The system of claim 1, wherein the electronic processor is configured to generate the electronic rendering by identifying at least one portion of the virtual space that when rendered changes in response to one or more changes in the subset of features and associated feature parameters, and re-render the at least one portion of the virtual space as part of the generated electronic rendering.

11. The system of claim 1, wherein the determining the feature-to-feature influence within the set of features based on at least one of:

a presence of a reflection between a first feature and a second feature, an alteration of the first feature with respect to the second feature, and a statistical correlation between the first feature to the second feature.

12. The system of claim 4, the first rendering quality metric being associated with low-quality rendering techniques including a rasterization to generate rapid electronic renderings, the low-quality rendering techniques representing at least one of:

a low number of reflective interactions and sight-line overlays, and the feature-to-feature influence within the set of features.

13. The method of claim 1, wherein each feature layer comprises a partial rendering of the virtual space that is composited by overlaying based on pixel coordinates within a fixed scene with other feature layers to form the electronic rendering.

14. A method comprising:

accessing feature data, the feature data including a set of features of a virtual space, wherein each feature included in the set of features is associated with at least one feature parameter, generating a set of sample electronic renderings for the virtual space for identifying a set of feature layers based on the feature data, based on one or more sample electronic renderings of the set of sample electronic renderings, determine a feature-to-feature influence within the set of features, determining rendering data based on the set of sample electronic renderings, wherein the rendering data includes the set of feature layers, wherein each feature layer is associated with at least one feature of the set of features, the set of feature layers representing partial renderings of the virtual space to be stored in a memory for later use in an on-demand rendering, receiving a rendering request for the on-demand rendering, the rendering request indicating a subset of features and associated feature parameters selected from the set of features as selected feature data, the rendering request retrieving, from the memory, the set of feature layers that match the rendering request and correspond to the selected feature data, and in response to receiving the rendering request, generating, using the rendering data and according to the rendering request, an electronic rendering of the virtual space based on the selected feature data, wherein generating the electronic rendering comprises:

determining a matching of a pre-rendered feature layer to the selected feature data in the memory:

rendering, in real time, a first part of the virtual space corresponding to at least one selected feature for which no matching a pre-rendered feature layer corresponding to the selected feature data is available in the memory; and rendering based on retrieval from the memory, a second part of the virtual space by compositing one or more pre-rendered feature layers that match the selected feature data.

15. The method of claim 14, determining, based on the feature-to-feature influence, the set of feature layers by organizing the subset of features having a threshold level of the feature-to-feature influence on a same one of the feature layers of the set.

16. The method of claim 15, wherein the subset of features having the feature-to-feature influence includes at least one of an appliance having a reflective surface, a cabinet, and a light fixture.

17. The method of claim 14, wherein the set of sample electronic renderings is associated with a first rendering quality metric and the electronic rendering is associated with a second rendering quality metric, wherein the second rendering quality metric is different than the first rendering quality metric.

18. The method of claim 14, wherein the set of sample electronic renderings is associated with a first rendering quality metric and the electronic rendering is associated with a second rendering quality metric, wherein the second rendering quality metric is higher than the first rendering quality metric.

19. The method of claim 14, wherein each of a plurality of sample electronic renderings included in the set of sample electronic renderings is associated with a different configuration of one or more features and associated feature parameters of the one or more features.

20. The method of claim 14, wherein the rendering data describes variations between sample electronic renderings included in the set of sample electronic renderings, and wherein the variations describe how at least one sample electronic rendering changed in response to a different configuration of one or more features and associated feature parameters of the one or more features.

21. The method of claim 14, wherein the rendering data identifies at least one portion of the virtual space that when rendered changes in response to a different configuration of one or more features and associated feature parameters of the one or more features.

22. The method of claim 14, wherein generating the electronic rendering comprises:

identifying at least one portion of the virtual space that when rendered changes in response to one or more changes in the subset of features and associated feature parameters, and re-rendering the at least one portion of the virtual space as part of the generated electronic rendering.

23. A non-transitory computer-readable medium storing software instructions that, when executed, cause an apparatus to:

access feature data, the feature data including a set of features of a virtual space, wherein each feature included in the set of features is associated with at least one feature parameter, generate a set of sample electronic renderings for the virtual space for identifying a set of feature layers based on the feature data, determine rendering data based on the set of sample electronic renderings, wherein the rendering data includes the set of feature layers, wherein each feature layer is associated with at least one feature of the set of features, based on an analysis of one or more sample electronic renderings of the set of sample electronic renderings, determine a feature-to-feature influence within the set of features, the set of feature layers representing partial renderings of the virtual space to be stored in a memory for later use in an on-demand rendering;

receive a rendering request for the on-demand rendering, the rendering request indicating a subset of features and associated feature parameters selected from the set of features as selected feature data, the rendering request retrieving, from the memory, the set of feature layers that match the rendering request and correspond to the selected feature data, and in response to receiving the rendering request, generate, using the rendering data and according to the rendering request, an electronic rendering of the virtual space based on the selected feature data, wherein to generate the electronic rendering comprises:

determining a matching of a pre-rendered feature layer to the selected feature data in the memory:

rendering, in real time, a first part of the virtual space corresponding to at least one selected feature for which no matching a pre-rendered feature layer corresponding to the selected feature data is available in the memory; and rendering, based on retrieval from the memory, a second part of the virtual space by compositing one or more pre-rendered feature layers that match the selected feature data.

* * * * *